US006088742A

United States Patent [19]

Sim

[11] Patent Number: 6,088,742

[45] Date of Patent: Jul. 11, 2000

[54] COMMAND QUEUING APPARATUS AND METHOD OF OPTICAL DISK DATA REPRODUCTION SYSTEM

[75] Inventor: Tae-hyeon Sim, Seoul, Rep. of Korea

[73] Assignee: Samsung Electronics Co., Ltd., Rep. of Korea

[21] Appl. No.: 08/993,752

[22] Filed: Dec. 19, 1997

[30] Foreign Application Priority Data

Dec. 20, 1996 [KR] Rep. of Korea ...................... 96-69321

[51] Int. Cl.[7] ...................................................... G06F 13/00

[52] U.S. Cl. ............................................... 710/52; 709/102

[58] Field of Search ............................ 709/102; 710/5–6, 710/82–58; 711/100

[56] References Cited

U.S. PATENT DOCUMENTS

| | | | |
|---|---|---|---|
| 4,615,001 | 9/1986 | Hudgins, Jr. . | |
| 5,283,899 | 2/1994 | Cook et al. . | |
| 5,404,548 | 4/1995 | Nishioka | 395/800 |
| 5,448,908 | 9/1995 | Ward | 398/200.13 |
| 5,502,833 | 3/1996 | Byru et al. | 398/459 |
| 5,535,340 | 7/1996 | Bell et al. | 398/872 |
| 5,548,795 | 8/1996 | Au | 398/872 |
| 5,603,063 | 2/1997 | Au | 398/825 |
| 5,640,596 | 6/1997 | Takamoto et al. | 398/841 |
| 5,790,813 | 8/1998 | Whittaker | 398/293 |
| 5,822,772 | 10/1998 | Chan et al. | 711/158 |
| 5,842,038 | 11/1998 | Williams et al. | 395/825 |
| 5,870,625 | 2/1999 | Chan et al. | 398/821 |
| 5,892,968 | 4/1999 | Iwasaki et al. | 398/292 |

OTHER PUBLICATIONS

ATA Packet Interface For CD–ROMs, SFF–8020i, Small Form Factor Committee Specification of, Revision 2.6 Proposed Jan. 22, 1996 208 pages.

*Primary Examiner*—Christopher B. Shin
*Attorney, Agent, or Firm*—Skjerven, Morrill, MacPherson, Franklin & Friel LLP; David T. Millers

[57] ABSTRACT

A method and apparatus are provided to buffer commands sent from a computer to a peripheral device such as an optical disk data reproduction system, e.g., a CD-ROM drive, so that, even when execution of a command by a microcontroller of the peripheral device is not completed, additional commands from the computer can be queued. The apparatus includes: (1) an intention data detection unit for detecting intention data expressing that a packet command is to be sent from a computer and for outputting the detected result; (2) a command storage unit for buffering the packet command in response to a write signal and for outputting a buffered packet command, in response to a read signal, to a microcontroller of the optical disk data reproduction system, which processes the packet command; (3) a wait state control unit for outputting the write signal in response to the detected result and a command write signal indicating that the computer has sent the packet command, and for outputting a read signal in response to a command read signal which is generated by the microcontroller and instructs the packet command to be transferred; and (4) a command presence detection unit for determining whether an additional packet command can be buffered in the command storage unit. The performance of the entire computer system is improved, since a packet command can be sent from the computer to the optical disk data reproduction system even when execution of a previously sent command is not completed, as long as an empty buffer is available in the command storage unit.

16 Claims, 6 Drawing Sheets

COMMAND QUEUING APPARATUS AND METHOD OF OPTICAL DISK DATA REPRODUCTION SYSTEM

BACKGROUND

1. Field of the Invention

The present invention relates to a peripheral device in a computer system, and more particularly to an apparatus and method for queuing a command in an optical disk data reproduction system, such as a compact disk-read only memory (CD-ROM) device or a digital versatile disk-read only memory (DVD-ROM) device, for sequentially receiving and performing a command given from a computer.

2. Description of Related Art

A CD-ROM drive is an auxiliary memory device and is used as a peripheral device of a computer. When the computer gives a command to a peripheral device using a task file register, the peripheral device decodes and performs the command. When a user uses a keyboard to input a command to a peripheral device, such as a CD-ROM drive, the computer decodes the command and sends the decoded command to the peripheral device.

There are two methods by which a computer sends a command to a peripheral device. The first method is used when the computer desires to initialize the peripheral device or to obtain performance characteristics of the peripheral device. Here, a command is given to the peripheral device using a task file register. The second method is used when control data is received from or sent to a microcontroller of a peripheral device such as a CD-ROM drive. Here, each command is sent in a packet. These methods are described in "The Specification of ATA Packet Interface for CD-ROMs (SFF-8020i), Revision 2.6 Proposal" published by Small Forms Factor Committee on Jan. 22, 1996, which is herein incorporated by reference in its entirety.

Conventionally, a system including a CD-ROM drive processes a packet command as follows. First, the computer writes a predetermined command, for example, "A0" in hexadecimal (i.e., 1010 0000 in binary) in a task file register. In response, the CD-ROM drive prepares to receive a command sent in a packet of 12 bytes each. Then, the computer sends the packet command to the CD-ROM drive. The CD-ROM drive decodes the 12-byte packet command and executes the command.

In the conventional method for processing packet commands, additional commands from the computer cannot be sent to the CD-ROM drive until the command presently being carried out is completed, degrading the performance of the entire computer system.

SUMMARY

A method and apparatus buffer commands sent from a computer to a peripheral device such as a CD-ROM drive so that, even when the peripheral device has not completed execution of a command, additional commands from the computer can be queued. A command queuing apparatus of an optical disk data reproduction system (ODDRS) includes: (1) an intention data detection unit for detecting intention data expressing that a packet command is to be sent from a computer and for outputting the detected result; (2) a command storage unit for buffering the packet command in response to a write signal and for outputting a buffered packet command, in response to a read signal, to a microcontroller of the ODDRS which processes the packet command; (3) a wait state control unit for outputting the write signal in response to the detected result and a command write signal indicating that the computer has sent the packet command, and for outputting a read signal in response to a command read signal which is generated by the microcontroller and instructs the packet command to be transferred; and (4) a command presence detection unit for determining whether an additional packet command can be buffered in the command storage unit.

A command queuing method is provided for storing a packet command outputted from a computer to an ODDRS and for sending a stored command to a microcontroller included in the ODDRS. The command queuing method comprises the steps of: (1) determining whether the packet command from the computer is to be stored or read; (2) storing the packet command from the computer in the command queuing apparatus when the packet command is to be stored; and (3) reading the stored packet command when the packet command is to be read.

DETAILED DESCRIPTION

Figure 1:
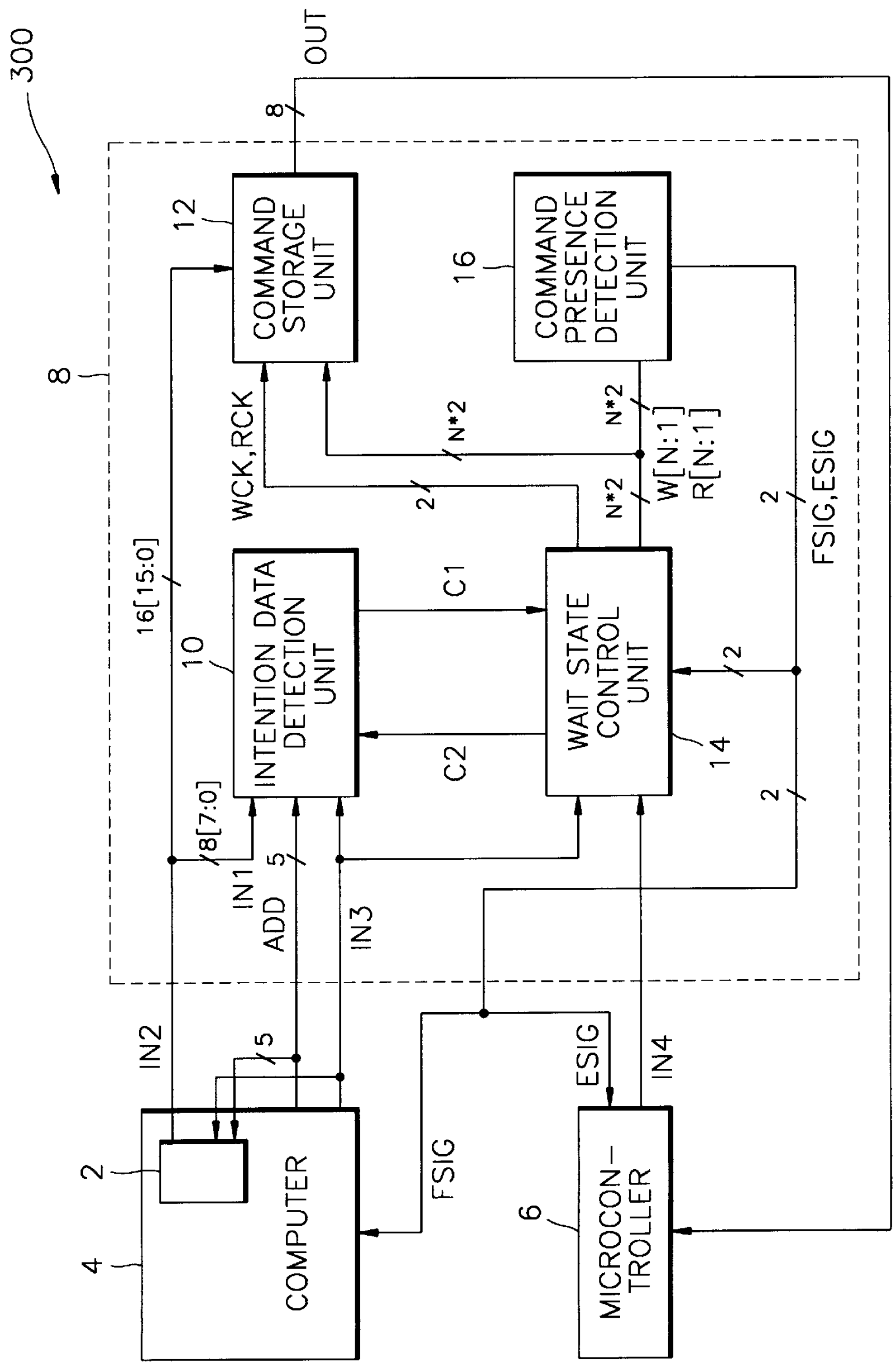
FIG. 1 shows a block diagram of a command queuing apparatus in accordance with the presentation.

FIG. 1 is a block diagram for explaining a command queuing apparatus according to the present invention, which includes a computer 4 having a task file register 2, a microcontroller 6 included in an optical disk data reproduction system (not shown), and a command queuing apparatus 8. Command queuing apparatus 8 includes an intention data detection unit 10, a command storage unit 12, a wait state control unit 14, and a command presence detection unit 16. Command queuing apparatus 8 depicted in FIG. 1 can be incorporated between computer 4 and microcontroller 6 of an optical disk data reproduction system such as a CD-ROM drive, a DVD-ROM drive, or other peripheral device. For the sake of an example, the construction and operation of the present invention is described with reference to a CD-ROM drive.

A packet command and data to be sent from computer 4 to microcontroller 6 of the CD-ROM drive are stored at an address ADD of task file register 2 included in computer 4 in response to a command write signal described below. In the exemplary embodiment, computer 4 and the CD-ROM drive implement the ATA Packet Interface protocol described above.

Figures 2A, 2B, 2C, 2D, 2E, 2F, 2G, 2H, 2I, 2J, 2K, 2L:
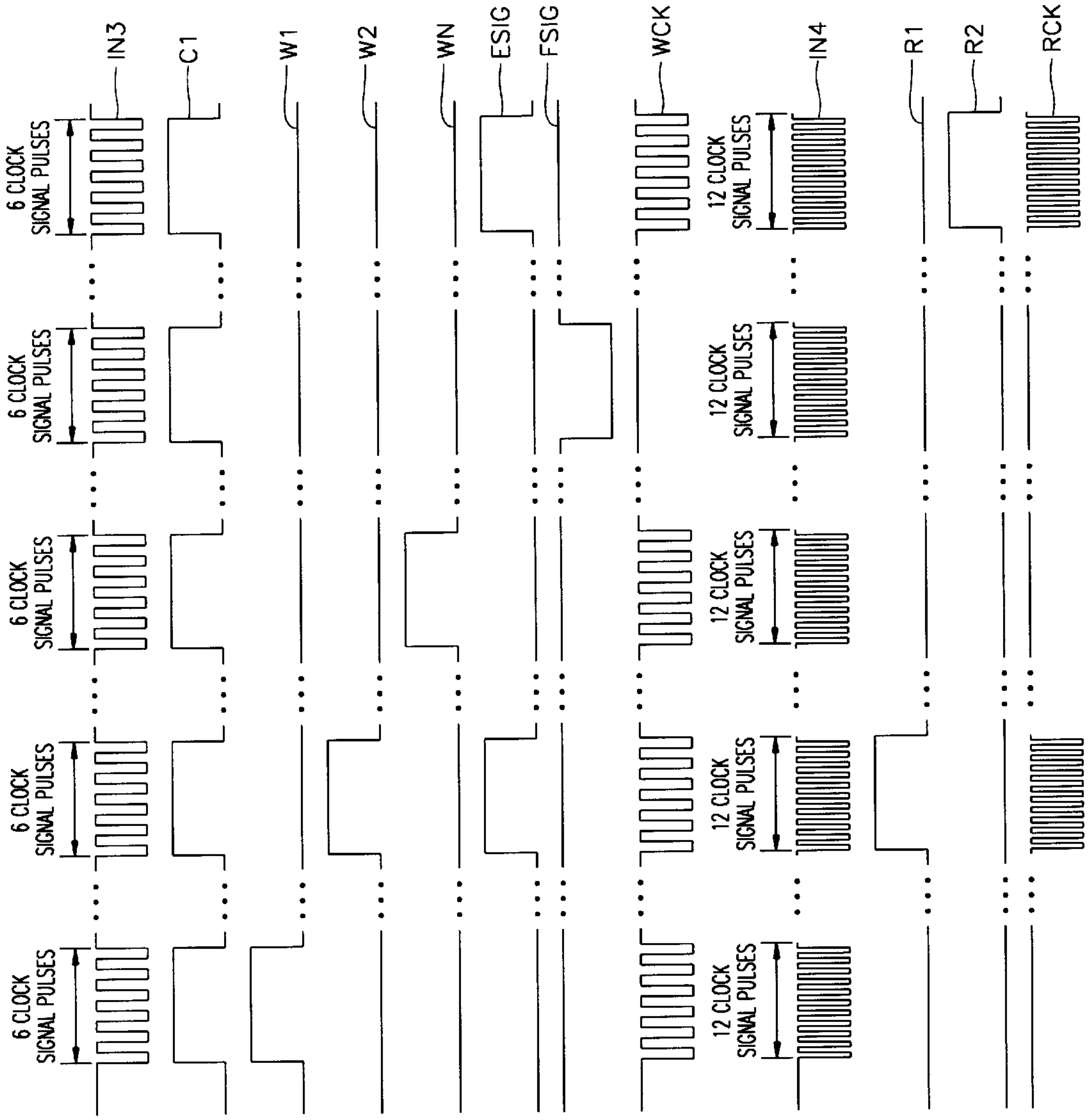
FIG. 2A shows a waveform diagram of a command write signal of the apparatus depicted in FIG 1.
FIG. 2B shows a waveform diagram of an enable signal of the apparatus depicted in FIG. 1.
FIG. 2C shows a waveform diagram of a write signal of the apparatus depicted in FIG. 1.
FIG. 2D shows a waveform diagram of a write signal of the apparatus depicted in FIG. 1.
FIG. 2E shows a waveform diagram of a write signal of the apparatus depicted in FIG. 1.
FIG. 2F shows a waveform diagram of a command presence indication signal issued by the command presence detection unit of FIG. 1.
FIG. 2G shows a waveform diagram of a storage permission signal issued by the command presence detection unit of FIG. 1.
FIG. 2H shows a waveform diagram of a write clock signal of the apparatus depicted in FIG. 1.
FIG. 2I shows a waveform diagram of a command read signal of the apparatus depicted in FIG. 1.
FIG. 2J shows a waveform diagram of a read signal of the apparatus depicted in FIG. 1.
FIG. 2K shows a waveform diagram of a read signal of the apparatus depicted in FIG. 1.
FIG. 2L shows a waveform diagram of a read clock signal of the apparatus depicted in FIG. 1.

In FIG. 1, intention data detection unit 10 receives the intention data signal IN1, detecting the presence of intention data signal IN1 recorded, in response to a command write signal IN3 (FIG. 2A), at a predetermined address ADD of task file register 2. The information contained in intention data signal IN1 indicates the intention that computer 4 will send a packet command to microcontroller 6. That is, computer 4 intends to store a command in command storage unit 12. When intention data is detected, intention data detection unit 10 asserts an enable signal C1 at "high" level, as illustrated in FIG. 2B, to wait state control unit 14. When intention data is not detected, enable signal C1 at unit 10 is kept at a "low" level. Wait state control unit 14 controls transfer of a 12-byte packet command, from computer 4 to command storage unit 12, and from command storage unit 12 to microcontroller 6. When the last byte of the packet command is stored in command storage unit 12, wait state control unit 14 asserts a reset signal C2, and intention data detection unit 10 resets enable signal C1 to a "low" level in response. How wait state control unit 14 detects whether the last byte of a packet command is stored in command storage unit 12 is described below when details of wait state control unit 14 are described in reference to FIG. 4.

Assuming that the intention data is hexadecimal "A0" (i.e., binary 01010 0000), the preferred embodiment of intention data detection unit 10 is explained as follows.

Figure 3:
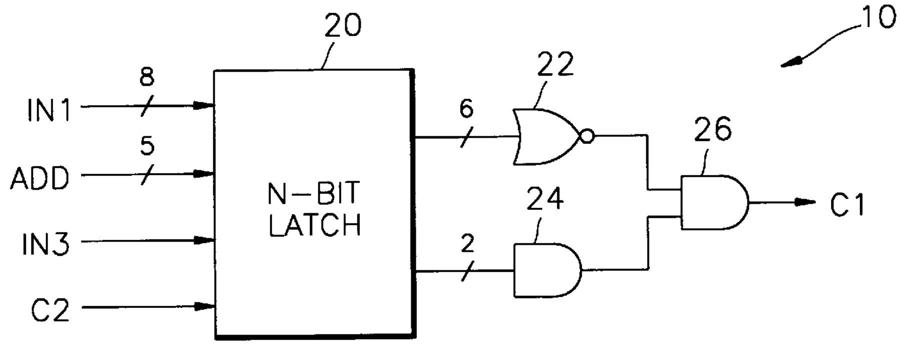
FIG. 3 shows a circuit diagram of the intention data detection unit depicted in FIG. 1, in accordance with a preferred embodiment of the present invention.

FIG. 3 is a circuit diagram of a preferred embodiment of intention data detection unit 10 illustrated in FIG. 1. Intention data detection unit 10 includes an N-bit latch 20, a NOR gate 22, and a first and a second AND gates 24 and 26. N-bit latch 20 latches intention data signal IN1, in response to command write signal IN3 and address signal ADD from computer 4, outputs the most significant bit and the third most significant bit among the latched data to first AND gate 24, and outputs the remaining bits to NOR gate 22. Second AND gate 26 performs an AND-operation on the outputs of the NOR gate 22 and the first AND gate 24, and outputs the result as enable signal C1 to the wait state control unit 14. Since intention data signal IN1 is "A0" (i.e., 1010 0000), the output of first AND gate 24 is at a "high" level and the output of the NOR gate 22 is at a "high" level. Therefore, the output of second AND gate 26 is at a "high" level. But, if reset signal C2 of a "high" level is inputted to N-bit latch 20, the N-bit latch 20 is reset and the N-bit latch 20 outputs "0000 0000", making enable signal C1 illustrated in FIG. 2B "low". One pulse of enable signal C1 (illustrated in FIG. 2B) spans six pulses of command write signal IN3 as illustrated in FIGS. 2A and 2B.

Figure 4:
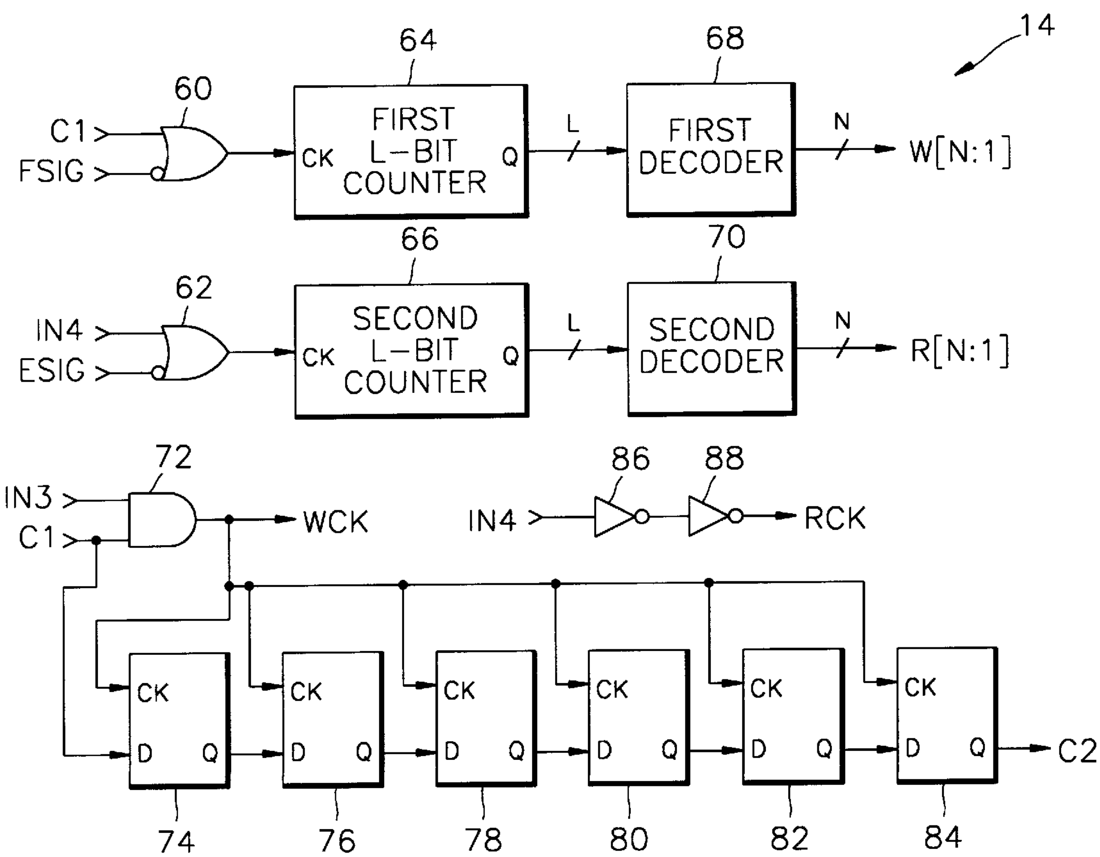
FIG. 4 shows a circuit diagram of the wait state control unit depicted in FIG. 1, in accordance with a preferred embodiment of the present invention.

The wait state control unit 14 illustrated in FIG. 4 includes first and second OR gates 60 and 62, first and second L-bit counters 64 and 66, first and second L-to-N decoders 68 and 70, a third AND gate 72, first and second inverters 86 and 88, and first through sixth D flip-flops 74, 76, 78, 80, 82 and 84. Here, L=log2N, where N is a power of 2. First OR gate 60 performs an OR-operation on enable signal C1 and the inverted storage permission signal FSIG' described below and outputs the result as the clock signal for L-bit counter 64. L-bit counter 64 counts in response to the output of the first OR gate 60 which is inputted to a clock port CK and outputs the result to decoder 68 through an output port Q. Decoder 68 decodes the output of L-bit counter 64 and outputs N write signals W[N:1], that is, W1 (FIG. 2C), W2 (FIG. 2D), . . . , WN (FIG. 2E).

OR gate 62 performs an OR-operation on command read signal IN4 and the inverted command presence indication signal ESIG' described below and outputs the result as the clock signal for L-bit counter 66. L-bit counter 66 counts in response to the clock signal, and outputs the result to second decoder 70 through output port Q. Decoder 70 decodes the output of L-bit counter 66 and outputs N read signals R[N:1], that is, R1 (FIG. 2J), R2 (FIG. 2K), . . . , and RN (not shown).

AND gate 72 performs an AND-operation on command write signal IN3 and enable signal C1, respectively illustrated in FIGS. 2A and 2B, and outputs the result as a write clock signal WCK illustrated in FIG. 2H. Inverters 86 and 88 delay command read signal IN4, (FIG. 2I) which is outputted from a microcontroller 6 of the CD-ROM drive, and output the result as a read clock signal RCK (FIG. 2L). Microcontroller 6 generates command read signal IN4 when microcontroller 6 has completed executing a command and is ready to perform a new command.

The first through the sixth D flip-flops 74, 76, 78, 80, 82 and 84 delay the enable signal C1 illustrated in FIG. 2B, in response to the write clock signal WCK illustrated in FIG. 2H. Since the size of a packet command is 12 bytes and the packet command is stored in the command storage unit 12, 2 bytes at a time, in response to a write clock signal WCK, the number of the clock cycles needed to store the 12-byte packet command is six. The delayed enable signal is outputted from flip-flop 84 as reset signal C2 to intention data detection unit 10.

As illustrated in FIG. 1, wait state control unit 14 outputs write signals W1, W2, . . . , WN in response to a storage permission signal FSIG being "high" (FIG. 2G), which is outputted from command presence detection unit 16. When storage permission signal FSIG is "low" (FIG. 2G), write signals are not generated as illustrated in FIGS. 2C–2E. Wait state control unit 14 outputs read signals such as R1 and R2 (FIGS. 2J and 2K, respectively), . . . , RN in response to a "high" command presence indication signal ESIG (FIG. 2F) from command presence detection unit 16, indicating that a command exists in one of the buffers. When command presence indication signal ESIG is "low" (indicating that no command exists in any buffer) as illustrated in FIG. 2F, read signals R1 and R2 are not generated as illustrated in FIGS. 2J and 2K. Storage permission signal FSIG and command presence indication signal ESIG are described in detail below.

Meanwhile, command storage unit 12 records the packet command sent from computer 4 via task file register 2. Packet command signal IN2 is a 16-bit signal indicating a word, each word being two bytes in this example, in response to write clock signal WCK (FIG. 2H) from wait state control unit 14. Each command stored as a packet in command storage unit 12 is transferred a byte at a time to microcontroller 6 as an output OUT (FIG. 1) in response to read clock signal RCK illustrated in FIG. 2L.

Command storage unit 12 stores a command in a 12-byte buffer selected among N 12-byte buffers by write signals W1, W2, . . . , WN (FIGS. 2C–2E), and reads out a command (as output OUT sent to the microcontroller 6) from a buffer among the N buffers selected by read signals R1 (FIG. 2J), R2 (FIG. 2K), . . . , RN (not shown). Wait state control unit 14 generates both write and read signals.

Figure 5:
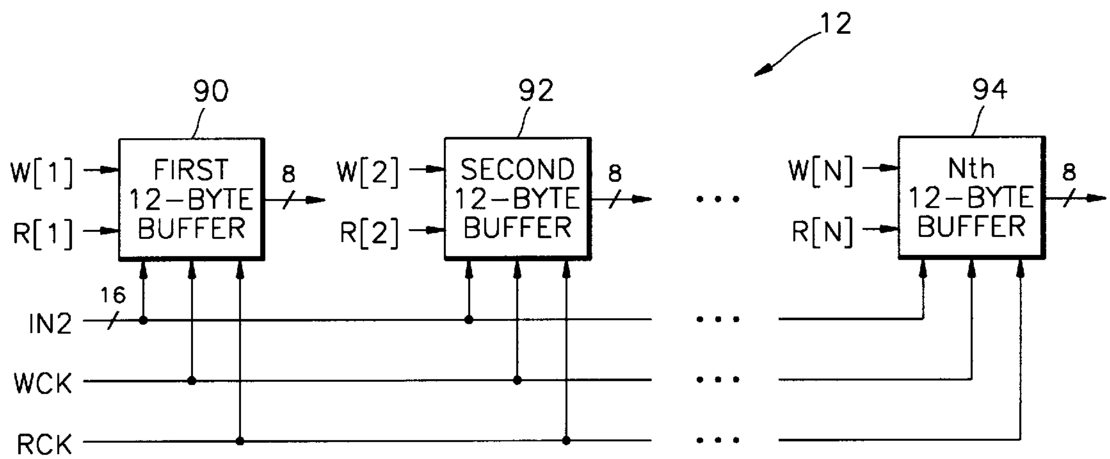
FIG. 5 shows a block diagram of the command storage unit depicted in FIG. 1, in accordance with a preferred embodiment of the present invention.

FIG. 5 is a block diagram of a preferred embodiment of command storage unit 12 when each command is a 12-byte packet. Command storage unit 12 includes a first 12-byte buffer 90, a second 12-byte buffer 92, . . . , and an Nth 12-byte buffer 94.

In FIG. 5, when the write signal W1 (illustrated in FIG. 2C) is asserted, the first 12-byte buffer 90 stores the packet command signal IN2 in response to write clock signal WCK (illustrated in FIG. 2H), and when read signal R1 (illustrated in FIG. 2J) is asserted, buffer 90 outputs a 12-byte packet command, 1 byte at a time, to microcontroller 6, in response to read clock signal RCK (illustrated in FIG. 2L). The second through Nth 12-byte buffers 92 through 94 performs similarly to the first 12-byte buffer 90. Namely, a 12-byte buffer stores information in response to the write clock signal WCK when selected by an associated write signal, and a buffer outputs a packet command in response to read clock signal RCK when selected by an associated read signal. The buffers of command storage unit 12 illustrated in FIG. 5 are operated as a first-in-first-out (FIFO) queue, making the first stored packet command read out first.

The command presence detection unit 16 illustrated in FIG. 1 determines whether an additional packet command can be stored in command storage unit 12, and asserts storage permission signal FSIG if there is an empty buffer. Command presence detection unit 16 also determines whether a packet command exists in one of the buffers of command storage unit 12, and, if so, asserts the command presence indication signal ESIG.

Figure 6:
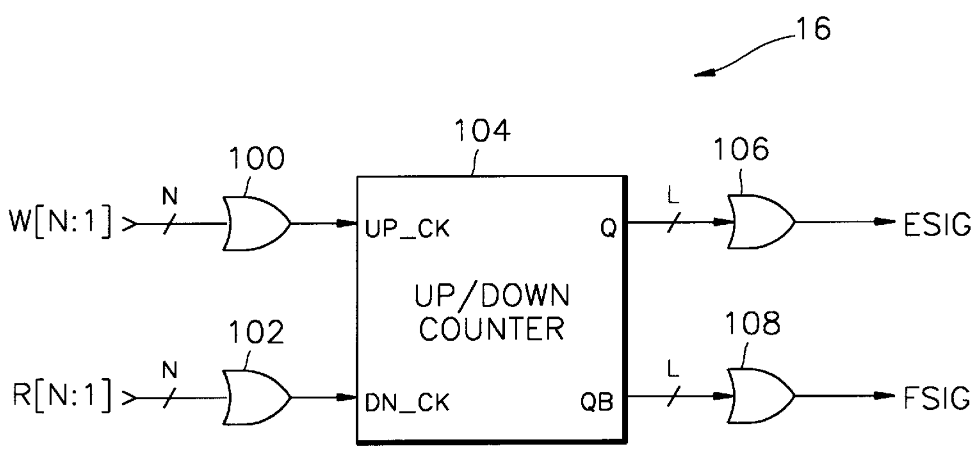
FIG. 6 shows a circuit diagram of the command presence detection unit depicted in FIG. 1, in accordance with a preferred embodiment of the present invention.

FIG. 6 shows a circuit diagram of command presence detection unit 16 depicted in FIG. 1, in accordance with a preferred embodiment of the present invention. Command presence detection unit 16 includes OR gates 100 and 102, an up/down counter 104, and OR gates 106 and 108. OR gate 100 performs an OR-operation on N bits of write signals W[N:1] and outputs the result to a clock port UP_CK of up/down counter 104. OR gate 102 performs an OR-operation on N bits of read signal R[N:1] and outputs the result to the clock port DN_CK of the up/down counter 104. Up/down counter 104 performs an up-counting operation in response to the output of OR gate 100 being "1" (on) and a down-counting operation in response to the output of OR gate 102 being "1" (on) and outputs the result to OR gates 106 and 108, respectively. Current L-bit counter value represents the number of writes minus the number of reads, i.e., the number of empty buffers currently available (where L=log2N, assuming N is a power of 2). OR gate 106 performs an OR-operation on L bits of the current counter value outputted from port Q of up/down counter 104, and outputs the result as the command presence indication signal ESIG. OR gate 108 performs an OR-operation on L bits of the complemented current counter value, which is outputted from port QB of counter 104 and outputs the result as storage permission signal FSIG. For example, assume there were 4 writes (i.e., storing of commands). If there were 4 reads, there would be no command left in command storage unit 12, and the current counter value will be binary 0000 (assuming the counter value is expressed in 4 bits). ORing 4 zero bits renders a '0' bit for ESIG signal, meaning there is no command to be read. ORing the complement of the current counter value, 1111, renders a '1' bit for FSIG, meaning there is at least one buffer to store another incoming command.

Figure 7:
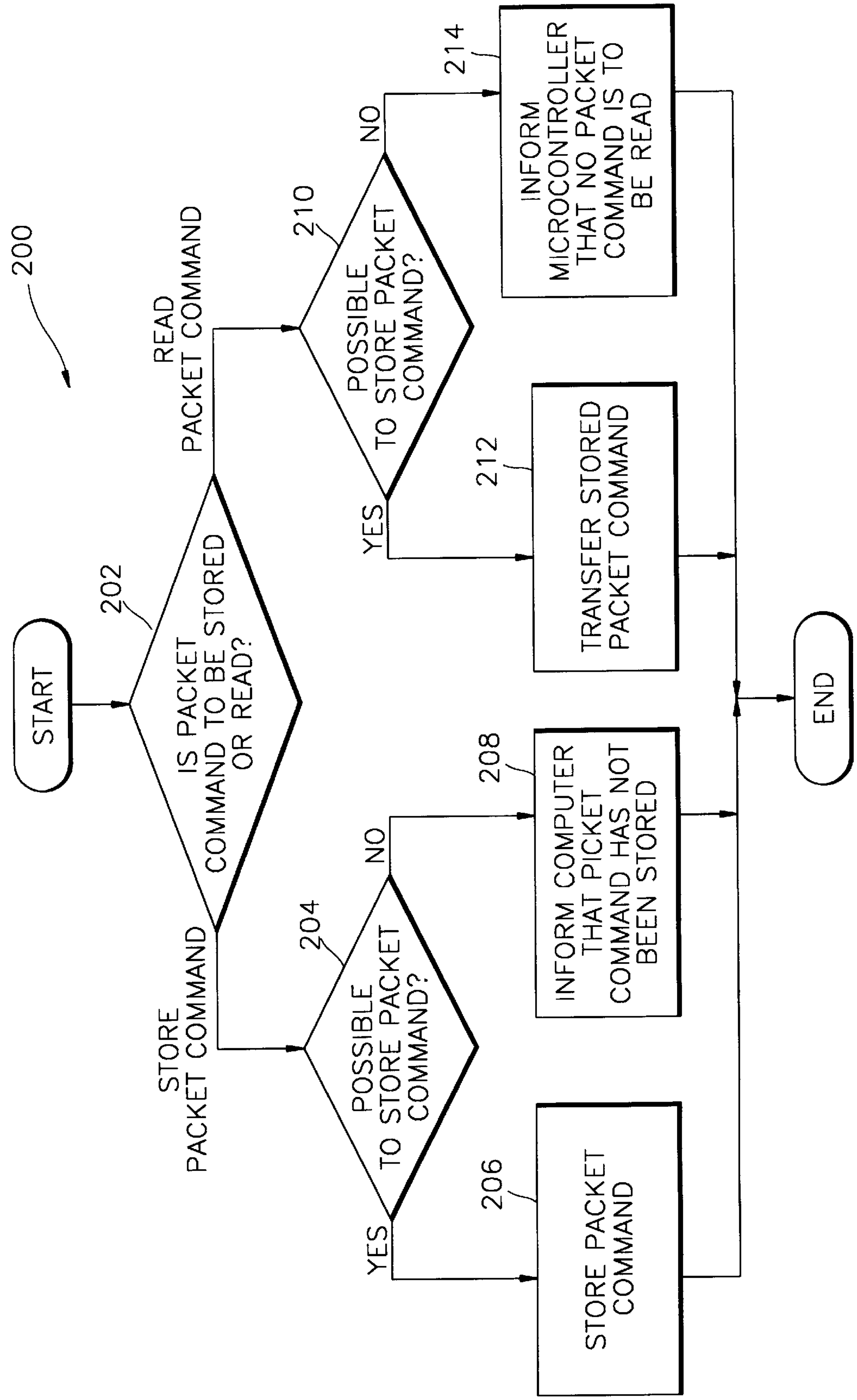
FIG. 7 shows a flowchart for explaining a command queuing method of the present invention preformed in the apparatus depicted in FIG. 1.

FIG. 7 shows a flowchart 200 for explaining the operations performed in the apparatus 8 depicted in FIG. 1. Flowchart 200 includes a step 202 of determining whether a packet command is to be stored or read, steps 204, 206 and 208 of storing the packet command, and steps 210, 212 and 214 of reading the packet command to microcontroller 6.

First, the apparatus 8 according to the present invention depicted in FIG. 1 determines whether a command from the computer is to be stored in a buffer of command storage unit 12, or a stored command is to be outputted to microcontroller 6 (step 202). If microcontroller 6 sends command read signal IN4 to wait state control unit 14, apparatus 8 illustrated in FIG. 1 determines that a stored command is to be outputted to microcontroller 6. If intention data detection unit 10 detects the presence of intention data IN1 in the task file register 2, apparatus 8 determines that computer 4 intends to send out a packet command to be stored in a buffer of the command storage unit 12. Then, before apparatus 8 stores the packet command in command storage unit 12, command presence detection unit 16 determines whether the packet command can be stored in command storage unit 12 (step 204). Namely, wait state control unit 14 determines whether command presence detection unit 16 generates a "high" storage permission signal FSIG. If so, the packet command is stored in command storage unit 12 (step 206) in the manner described above with respect to signals FSIG and ESIG. However, when storage permission signal FSIG is at "low" level, computer 4 is informed that another packet command can not be stored (step 208) in command storage unit 12.

When microcontroller 6 instructs a packet command to be read from command storage unit 12, that is, wait state control unit 14 receives command read signal IN4 from microcontroller 6, command presence detection unit 16 determines whether a packet command exists in command storage unit 12 (step 210). If a packet command is stored in command storage unit 12, the packet command is sent to microcontroller 6 as output OUT (step 212). However, when command presence indication signal ESIG is low indicating that no packet commands are stored in command storage unit 12, wait state control unit 14 informs microcontroller 6 that there is no packet command to be read (step 214).

According to the command queuing method and apparatus of an optical disk data reproduction system described above, the performance of the entire computer system is improved, since (1) waiting of the CPU of the computer is reduced by buffering packet commands sent from the computer even when a previously sent command has not been fully executed, as long as there is an empty buffer in the command storage unit 12, and (2) waiting of the microcontroller is reduced by informing the microcontroller as soon as possible that there is no more command to be read out from the command storage unit 12.

Figure 8:
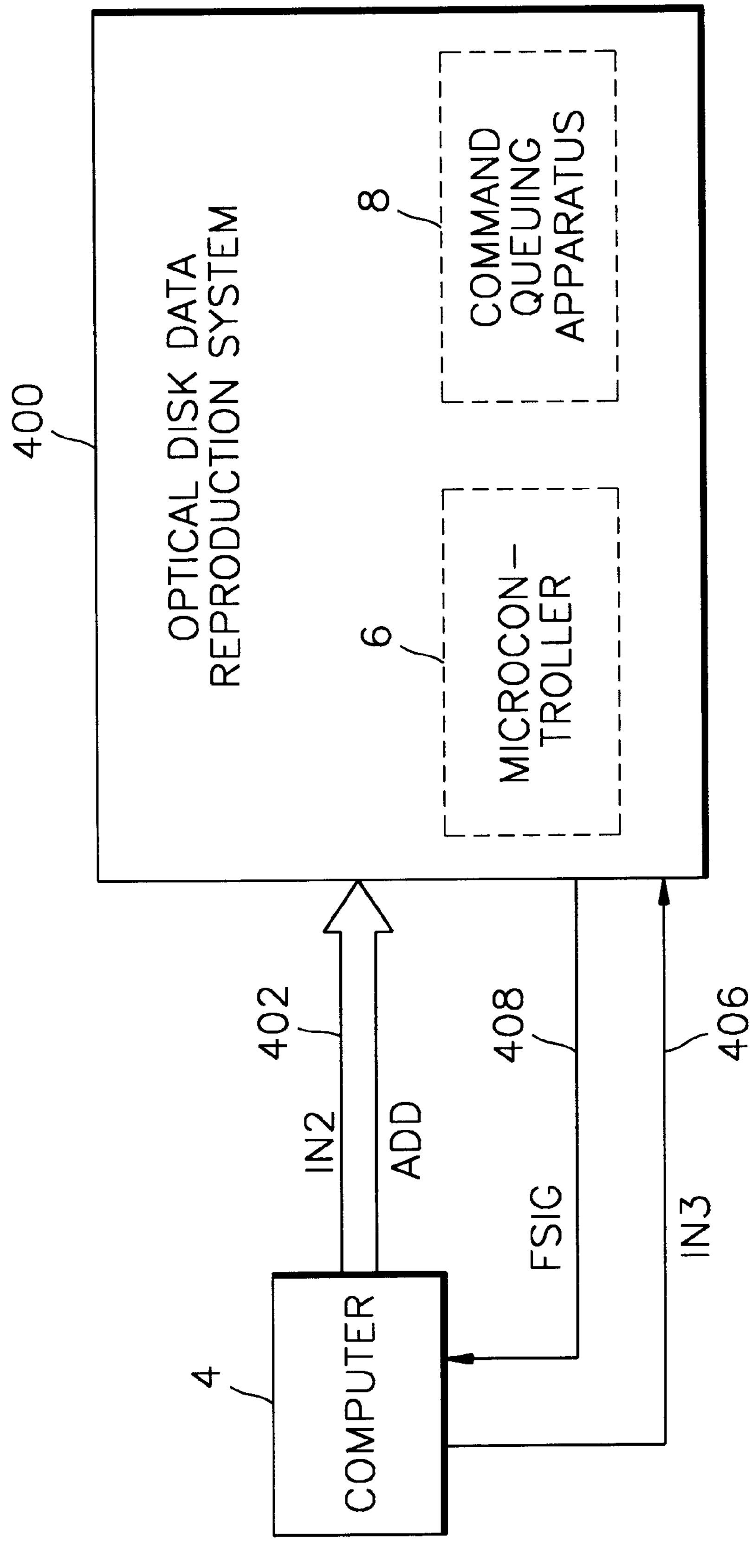
FIG. 8 shows a schemetic diagram for explaining the relationship between the computer and the optical disk data reproduction system.

FIG. 8 shows a schemetic diagram for explaining the relationship between the computer 4 and the optical disk data reproduction system 400 which includes the microcontroller 6 and the command queuing apparatus 8 of the present invention.

The computer 4, the microcontroller 6 and the command queuing apparatus 8 illustrated in FIG. 8 correspond to the computer 4, the microcontroller 6 and the command queuing apparatus 8 illustrated in FIG. 1, respectively. That is, the computer 4 illustrated in FIG. 8 transmits the data IN2 and address ADD to the optical disk data reproduction system 400, through the data bus 402. Also, the signal FSIG is transmitted from the optical disk data reproduction system 400 to the computer 4 through the control line 408 and the signal IN3 is transmitted from the computer 4 to the optical disk data reproduction system 400 through the control line 406.

The above detailed description is provided to illustrate a specific embodiment of the present invention and is not intended to be limiting. Although described using an optical disk data reproduction system receiving commands from a computer as an example, the present invention is applicable to any type of communication between a command-issuing host device and any peripheral device where the communication can be enhanced by using the present invention. Numerous modifications and variations within the scope of the present invention are possible. For example, an alternative sequential circuit can be used instead of up/down counter illustrated in FIG. 6 which is used to determine availability of an empty buffer or a stored command in command storage unit 12. Also, although CD-ROM drives and DVD-ROM drives were taken as specific examples of optical disk data reproduction systems, any device that can reproduce optical disk data can be used in a different embodiment, e.g., drives that can both read and write on compact disks or a digital versatile disks. The present invention is defined by the following claims.

I claim:

1. A command queuing apparatus of an optical data reproduction system including a microcontroller, the command queuing apparatus comprising:

(a) an intention data detection unit that: receives intention data from a computer indicating that an incoming command is to be sent to the optical data reproduction system; and outputs a detection signal according to the intention data;

(b) a command storage unit comprising a plurality of buffers including a receiving buffer and a sending buffer, wherein the receiving buffer and the sending buffer may be identical, wherein the command storage unit:

in response to receiving a write signal, stores the incoming command from the computer in the receiving buffer among the buffers; and in response to receiving a read signal, retrieves an outgoing command from the sending buffer among the buffers and sends the outgoing command to the microcontroller; and (c) a wait state control unit which: outputs the write signal in response to receiving the detection signal from the intention data detection unit and a command write signal which indicates that the computer is sending the incoming command for the optical data reproduction system; and outputs the read signal in response to a command read signal generated by the microcontroller.

2. The command queuing apparatus of claim 1, wherein, in response to detecting completion of storing the incoming command in the receiving buffer, the wait state control unit sends a reset signal to the intention data detection unit to reset the detection signal outputted by the intention data detection unit.

3. The command queuing apparatus of claim 1, wherein the command queuing apparatus further comprises:

a command presence detection unit that:

computes a result of comparing (1) the number of buffers in the command storage unit with (2) a difference of subtracting the number of times the read signals has been generated from the number of times the write signal has been generated; and according to the result, outputs a storage permission signal indicating whether the command storage unit can store an additional incoming command, wherein the wait state control unit does not output the write signal when the storage permission signal indicates that the command storage unit cannot store an additional incoming command.

4. The command queuing apparatus of claim 3, wherein the command presence detection unit comprises:

a first counter for counting the number of times the write signal is generated;

a second counter for counting the number of times the read signal is generated;

a subtractor for subtracting the counted value of the second counter from the counted value of the first counter;

a comparator for comparing the subtracted result with the number of buffers in the command storage unit and outputting a result of the comparator comparing; and a signal generator for outputting the storage permission signal according to the result of the comparator comparing.

5. The command queuing apparatus of claim 1, wherein the intention data detection unit comprises:

an N-bit latch for latching the intention data of N bit(s) in response to the command write signal, wherein the N-bit latch is reset in response to the reset signal and N is a positive integer;

a NOR gate for receiving predetermined bits among the N bit(s) of the intention data latched in the N-bit latch, and for performing a NOR operation on the predetermined bits;

a first AND gate for performing an AND operation on bits among the N bits excluding the predetermined bits; and a second AND gate for performing an AND operation on an output of the first AND gate and an output of the NOR gate, and for outputting the detection signal.

6. The command queuing apparatus of claim 1, wherein the plurality of the buffers work as a first-in-first-out (FIFO) queue so that an incoming command stored earliest in a receiving buffer of the command storage unit being retrieved earliest as an outgoing command.

7. The command queuing apparatus of claim 1, wherein the optical data reproduction system is a CD-ROM drive.

8. The command queuing apparatus of claim 1, wherein the optical data reproduction system is a DVD-ROM drive.

9. A command queuing method for buffering commands sent from a command-issuing device to an optical data reproduction system in a command queuing apparatus, the command queuing method comprising:

determining whether any buffer from among a plurality of buffers in the command queuing apparatus is available for storage of a command from the command-issuing device;

informing the command-issuing device that a command cannot be stored when it is determined that no buffer is available;

determining whether an incoming command sent from the command-issuing device is to be stored in a receiving buffer among the buffers in the command queuing apparatus, or an outgoing command is to be retrieved from a sending buffer among the buffers and sent to a microcontroller included in the optical data reproduction system;

when the result of determining is to store the incoming command, storing the incoming command in the receiving buffer; and when the result of determining is to read the command, retrieving the outgoing command from the sending buffer and sending the outgoing command to the microcontroller.

10. A command queuing method for buffering commands sent from a command-issuing device to an optical data reproduction system in a command queuing apparatus, the command queuing method comprising:

determining whether an incoming command sent from the command-issuing device is to be stored in a receiving buffer among a plurality of buffers included in the command queuing apparatus, or an outgoing command is to be retrieved from a sending buffer among the buffers and sent to a microcontroller included in the optical data reproduction system, wherein the plurality of buffers are implemented as a first-in-first-out queue so that a command stored first among the commands currently stored in the buffers is retrieved first;

when the result of determining is to store the incoming command, storing the incoming command in the receiving buffer; and when the result of determining is to read the command, retrieving the outgoing command from the sending buffer and sending the outgoing command to the microcontroller.

11. A command queuing method for buffering commands sent from a command-issuing device to an optical data reproduction system in a command queuing apparatus, the command queuing method comprising:

determining whether an incoming command sent from the command-issuing device is to be stored in a receiving buffer among a plurality of buffers included in the command queuing apparatus, or an outgoing command is to be retrieved from a sending buffer among the buffers and sent to a microcontroller included in the optical data reproduction system;

when the result of determining is to store the incoming command, storing the incoming command in the receiving buffer; and when the result of determining is to read the command, retrieving the outgoing command from the sending buffer and sending the outgoing command to the microcontroller, wherein the storing step includes:

determining whether the command-issuing device intends to send the incoming conmmand;

determining whether the command-issuing device is sending the incoming command;

determining whether there is an empty buffer in the command queuing apparatus to store the incoming command;

writing the command to the empty buffer when it is determined that there is an empty buffer; and informing the command-issuing device that the command cannot be stored when it is determined that there is no empty buffer.

12. A command queuing method for buffering commands sent from a command-issuing device to an optical data reproduction system in a command queuing apparatus, the command queuing method comprising:

determining whether an incoming command sent from the command-issuing device is to be stored in a receiving buffer among a plurality of buffers included in the command queuing apparatus, or an outgoing command is to be retrieved from a sending buffer among the buffers and sent to a microcontroller included in the optical data reproduction system;

when the result of determining is to store the incoming command, storing the incoming command in the receiving buffer; and when the result of determining is to read the command, retrieving the outgoing command from the sending buffer and sending the outgoing command to the microcontroller, wherein the retrieving step includes:

determining whether the microcontroller requested a command to be read;

determining whether a command exists in one of the buffers;

when it is determined that a command exists in one of the buffer, retrieving a command stored in one of the buffers and sending the command to the microcontroller; and informing the microcontroller that no command can be read when none of the buffers holds a command.

13. The command queuing method of claim 11, wherein the step of determining whether there is an empty buffer in the command queuing apparatus comprises:

counting the number of times incoming commands were stored in the command queuing apparatus;

counting the number of times outgoing commands were retrieved from command queuing apparatus;

computing a difference by subtracting the number of times outgoing command were retrieved from the command queuing apparatus from the number of times incoming commands were stored in the command queuing apparatus;

comparing the difference with the number of buffers; and outputting a signal according to the result of comparing.

14. The command queuing method of claim 12, wherein the step of determining whether a command exists in one of the buffers comprises:

counting the number of times incoming commands were stored in the command queuing apparatus;

counting the number of times outgoing commands were retrieved from command queuing apparatus;

computing a difference by subtracting the number of times outgoing command were retrieved from the command queuing apparatus from the number of times incoming commands were stored in the command queuing apparatus;

comparing the difference with the number of buffers; and outputting a signal according to the result of comparing.

15. The command queuing method of claim 9, wherein the optical data reproduction system is a CD-ROM drive.

16. The command queuing method of claim 9, wherein the optical data reproduction system is a DVD-ROM drive.

* * * * *